United States Patent
Ushigome et al.

(10) Patent No.: US 10,065,431 B2
(45) Date of Patent: Sep. 4, 2018

(54) SYSTEM FOR FORMING STRUCTURE ON PRINT MEDIUM

(71) Applicant: CASIO COMPUTER CO., LTD., Tokyo (JP)

(72) Inventors: Youichi Ushigome, Akishima (JP); Satoshi Kurosawa, Toshima (JP); Junichi Ono, Higashikurume (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/451,556

(22) Filed: Mar. 7, 2017

(65) Prior Publication Data
US 2017/0334214 A1  Nov. 23, 2017

(30) Foreign Application Priority Data

May 17, 2016 (JP) .................. 2016-099151

(51) Int. Cl.
*B41M 3/06* (2006.01)
*B41J 2/447* (2006.01)

(52) U.S. Cl.
CPC ............... *B41J 2/447* (2013.01); *B41M 3/06* (2013.01)

(58) Field of Classification Search
CPC ............. B29C 44/022; B29C 44/3415; B29C 2035/0822; B29C 35/0805; B29C 64/386; B29C 64/393; B41J 11/002; B41J 3/407; B33Y 50/02; B33Y 10/00; B33Y 30/00; B33Y 50/00; B41M 7/009; B41M 3/00
See application file for complete search history.

(56) References Cited

U.S. PATENT DOCUMENTS

| | | | | |
|---|---|---|---|---|
| 8,870,327 B2* | 10/2014 | Kanamura | ............... | B41J 3/407 347/15 |
| 9,492,956 B2* | 11/2016 | Horiuchi | .................... | B41J 3/28 |
| 9,522,490 B2* | 12/2016 | Horiuchi | ............ | B29C 44/0461 |
| 9,579,833 B2* | 2/2017 | Horiuchi | ............... | B29C 44/022 |
| 2012/0218338 A1* | 8/2012 | Kanamura | ............... | B41J 3/407 347/15 |

(Continued)

FOREIGN PATENT DOCUMENTS

| JP | S64-28660 A | 1/1989 |
|---|---|---|
| JP | H11-254788 A | 9/1999 |

(Continued)

OTHER PUBLICATIONS

Computer-generated translation of JP 2013-132765, published on Jul. 2013.*

(Continued)

*Primary Examiner* — Huan Tran
(74) *Attorney, Agent, or Firm* — Scully, Scott, Muprhy & Presser, P.C.

(57) ABSTRACT

A system for forming a structure on a print medium 1 includes: a print unit (print device) 10 for printing an electromagnetic wave-heat conversion layer for converting electromagnetic waves into heat, on a medium including an expansion layer that expands by heating; an expansion unit (expansion device) 20 aligned laterally with the print unit 10, for expanding the expansion layer by irradiating the medium with electromagnetic waves; and a top plate 30 covering the print unit 10 and the expansion unit 20 from above.

18 Claims, 7 Drawing Sheets

(56) References Cited

U.S. PATENT DOCUMENTS

| | | | | |
|---|---|---|---|---|
| 2013/0161874 A1* | 6/2013 | Horiuchi | ............... | B29C 44/022 |
| | | | | 264/415 |
| 2013/0229478 A1* | 9/2013 | Horiuchi | ............... | B41M 7/009 |
| | | | | 347/188 |
| 2013/0280498 A1* | 10/2013 | Horiuchi | ................ | B42C 19/02 |
| | | | | 428/195.1 |
| 2014/0110887 A1* | 4/2014 | Horiuchi | ................... | B41J 3/28 |
| | | | | 264/413 |
| 2017/0144339 A1* | 5/2017 | Horiuchi | ............ | B29C 44/3415 |
| 2017/0274584 A1* | 9/2017 | Fujimoto | ............ | B29C 67/0051 |

FOREIGN PATENT DOCUMENTS

| | | | |
|---|---|---|---|
| JP | 2000-071554 A | 3/2000 | |
| JP | 2001-150812 A | 6/2001 | |
| JP | 2001-212947 A | 8/2001 | |
| JP | 2008-143069 A | 6/2008 | |
| JP | 2013-136171 A | 7/2013 | |
| JP | 2013-180559 A | 9/2013 | |
| JP | 2013-220641 A | 10/2013 | |
| JP | 2013-220647 A | 10/2013 | |
| JP | 2014-081582 * | 5/2014 | ................ B41J 2/01 |
| JP | 2014-083740 A | 5/2014 | |
| JP | 5729293 B2 | 6/2015 | |

OTHER PUBLICATIONS

English Abstract of JP 2013-132765 A, dated Jul. 8, 2013.
Notification of Reasons for Refusal dated Jun. 5, 2018 received in Japanese Patent Application No. JP 2016-099151 together with an English language translation.

* cited by examiner

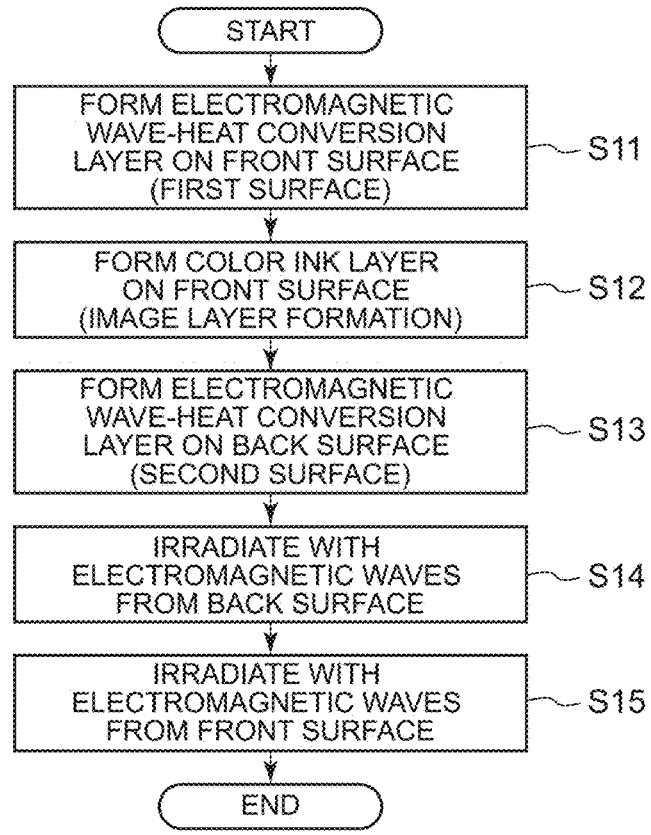
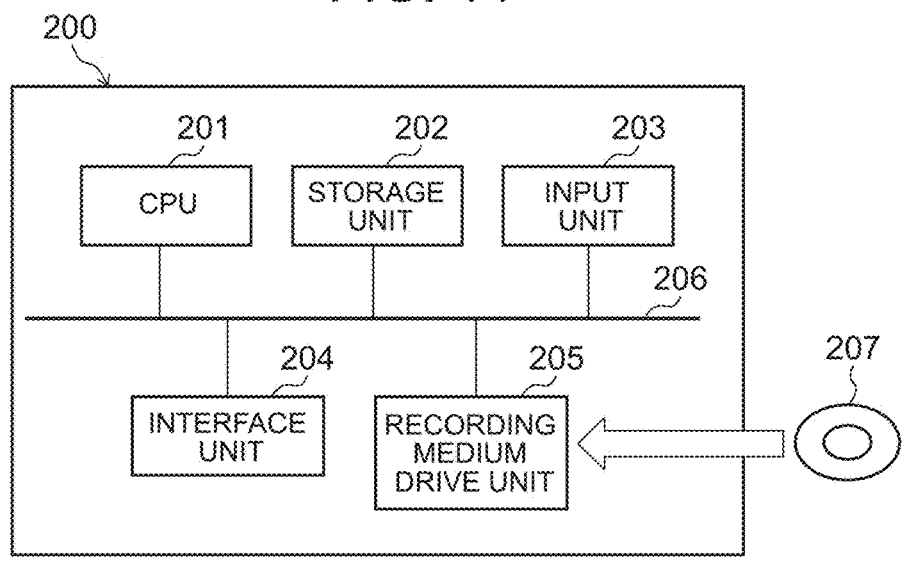

SYSTEM FOR FORMING STRUCTURE ON PRINT MEDIUM

CROSS-REFERENCE TO RELATED APPLICATIONS

This application is based upon and claims the benefit of priority from the prior Japanese Patent Application No. 2016-099151, filed May 17th, 2016, the entire contents of which are incorporated herein by reference.

BACKGROUND OF THE INVENTION

1. Field of the Invention

The present invention relates to a system for forming a structure on a print medium for manufacturing a structure.

2. Description of the Related Art

A method of forming, on a medium (e.g. a thermal expansion sheet) having an expansion layer that foams to expand according to the amount of absorbed heat on one surface, an electromagnetic wave-heat conversion layer for converting electromagnetic waves into heat by printing and, by electromagnetic irradiation, expanding to raise the part of the expansion layer where the electromagnetic wave-heat conversion layer has been formed on the medium to manufacture a structure has been conventionally known (for example, see Japanese Patent Application Laid-Open No. S64-28660, Japanese Patent Application Laid-Open No. 2001-150812).

To manufacture such a structure, a device for forming the electromagnetic wave-heat conversion layer on the medium and a device for irradiating the medium with electromagnetic waves are needed. However, no consideration has been made on how to enhance workability when manufacturing the structure using a system that combines these devices.

The present invention has an object of providing a system for forming a structure on a print medium that can enhance workability when manufacturing a structure using a system that combines a device for forming an electromagnetic wave-heat conversion layer and a device for irradiating with electromagnetic waves.

SUMMARY OF THE INVENTION

A system for forming a structure on a print medium includes: a print device for printing an electromagnetic wave-heat conversion layer for converting electromagnetic waves into heat, on a medium including an expansion layer that expands by heating; an expansion device aligned laterally with the print device, for expanding the expansion layer by irradiating the medium with electromagnetic waves; and a top plate covering the print device and the expansion device from above.

A system for forming a structure on a print medium includes: a print device for printing an electromagnetic wave-heat conversion layer for converting electromagnetic waves into heat, on a medium including an expansion layer that expands by heating; and an expansion device aligned laterally with the print device, for expanding the expansion layer by irradiating the medium with electromagnetic waves, wherein each of the print device and the expansion device includes: a suction part for sucking the medium; and a discharge part for discharging the medium, and wherein the suction part of the print device and the suction part of the expansion device are aligned along a lateral direction in which the print device and the expansion device are aligned.

A system for forming a structure on a print medium includes: a print device for printing an electromagnetic wave-heat conversion layer for converting electromagnetic waves into heat, on a medium including an expansion layer that expands by heating; an expansion device aligned laterally with the print device, for expanding the expansion layer by irradiating the medium with electromagnetic waves; a top plate covering the print device and the expansion device from above; and a display unit located above the expansion device, for displaying information.

According to the present invention, it is possible to enhance workability when manufacturing a structure using a system that combines a device for forming an electromagnetic wave-heat conversion layer and a device for irradiating with electromagnetic waves.

BRIEF DESCRIPTION OF THE SEVERAL VIEWS OF THE DRAWING

FIG. 10 is a flowchart for describing a structure manufacturing method in the embodiment of the present invention.

FIG. 11 is a diagram illustrating an example of the hardware structure of a computer capable of operating as a control unit in the embodiment of the present invention.

DETAILED DESCRIPTION OF THE INVENTION

The following describes a system for forming a structure on a print medium according to an embodiment of the present invention with reference to drawings.

Figure 1A:
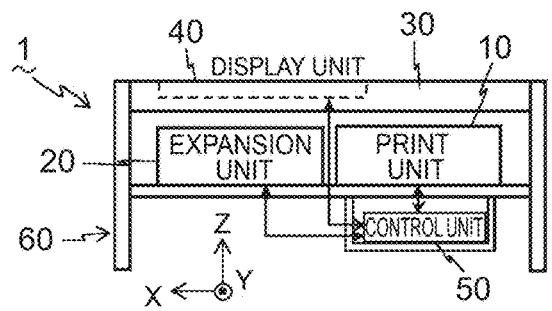
FIG. 1A is a front view schematically illustrating a system for forming a structure on a print medium according to an embodiment of the present invention.
Figure 1B:
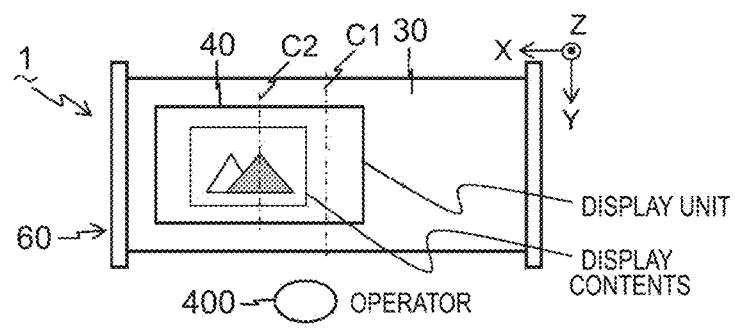
FIG. 1B is a plan view schematically illustrating the structure manufacturing system according to the embodiment of the present invention.

FIGS. 1A and 1B are a front view and plan view schematically illustrating a system for forming a structure on a print medium 1.

Figure 1C:
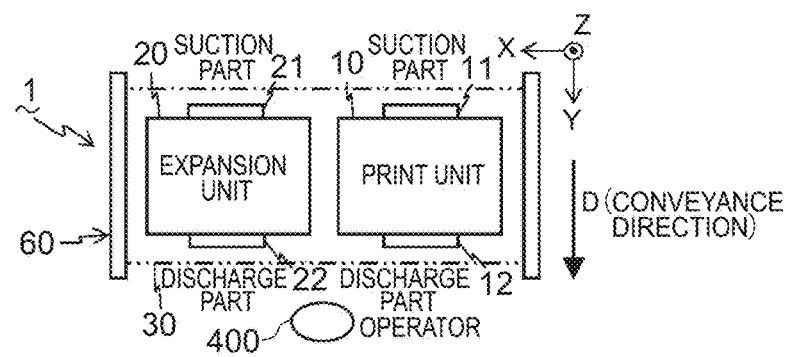
FIG. 1C is a plan view schematically illustrating the system for forming a structure on a print medium according to the embodiment of the present invention in a closed state before pulling out a top plate.
Figure 1D:
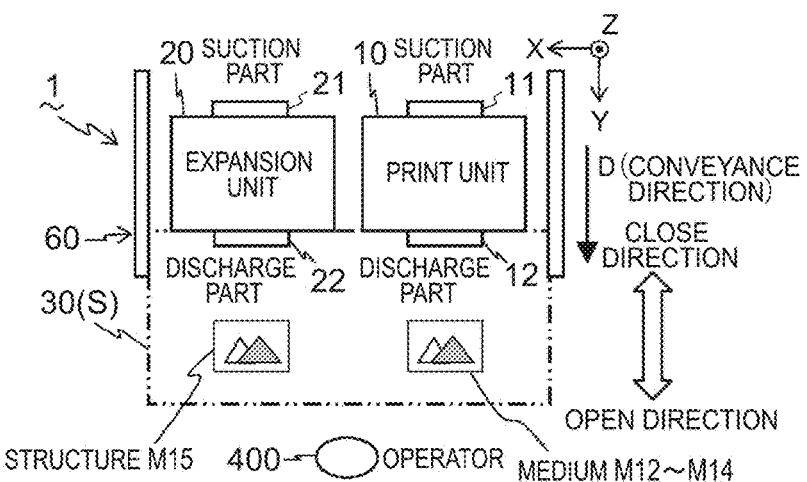
FIG. 1D is a plan view schematically illustrating the system for forming a structure on a print medium according to the embodiment of the present invention in an open state after pulling out the top plate.

FIGS. 1C and 1D are plan views schematically illustrating the system for forming a structure on a print medium 1 in a closed state before pulling out a top plate 30 and an open state after pulling out the top plate 30.

Figure 2:
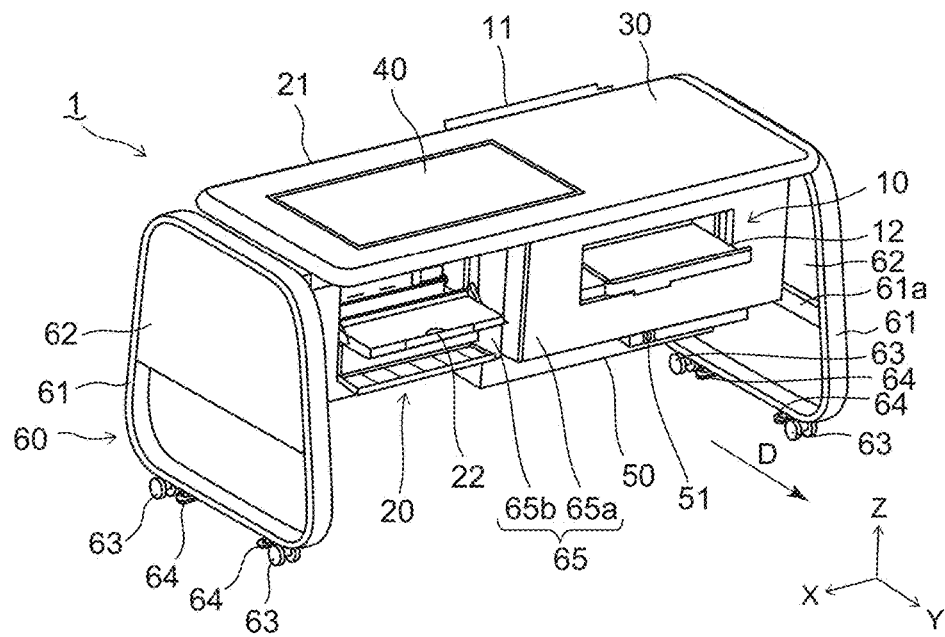
FIG. 2 is a perspective view of the system for forming a structure on a print medium according to the embodiment of the present invention as seen from front left above.
Figure 3:
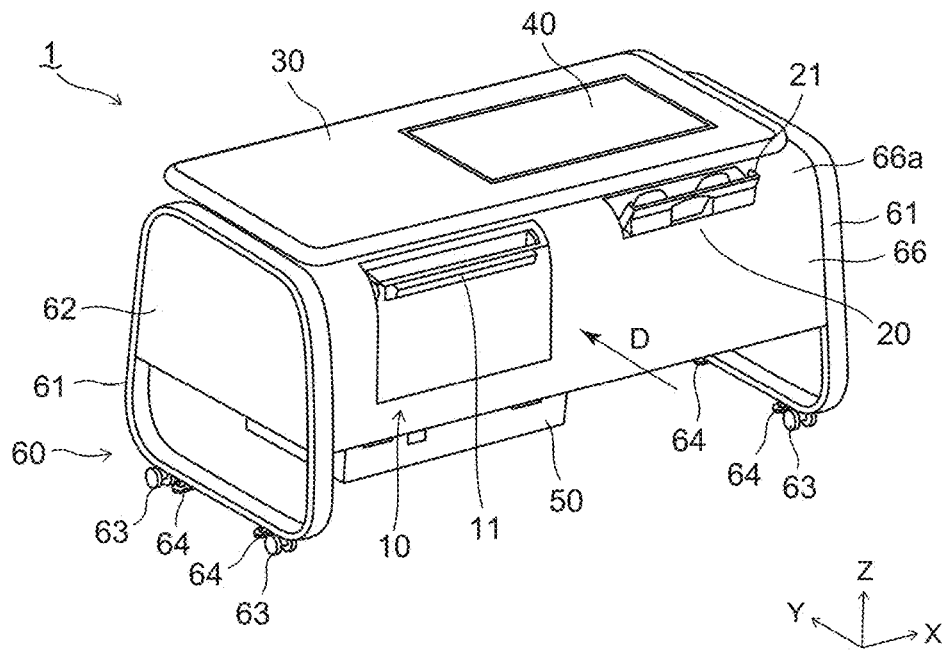
FIG. 3 is a perspective view of the system for forming a structure on a print medium according to the embodiment of the present invention as seen from back right above.

FIGS. 2 and 3 are a perspective view of the system for forming a structure on a print medium 1 as seen from front left above and a perspective view of the system for forming a structure on a print medium 1 as seen from back right above.

Figure 4:
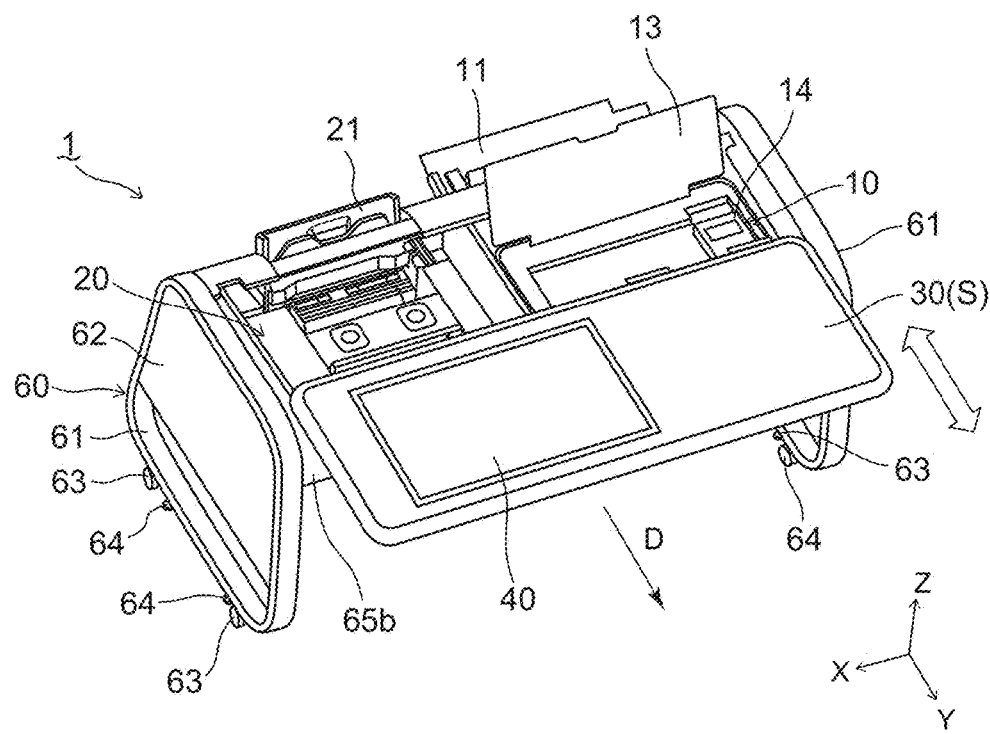
FIG. 4 is a perspective view of the system for forming a structure on a print medium according to the embodiment of the present invention in an open state after pulling out the top plate as seen from front left above.

FIG. 4 is a perspective view of the system for forming a structure on a print medium 1 in an open state after pulling out the top plate 30 as seen from front left above.

Figure 5:
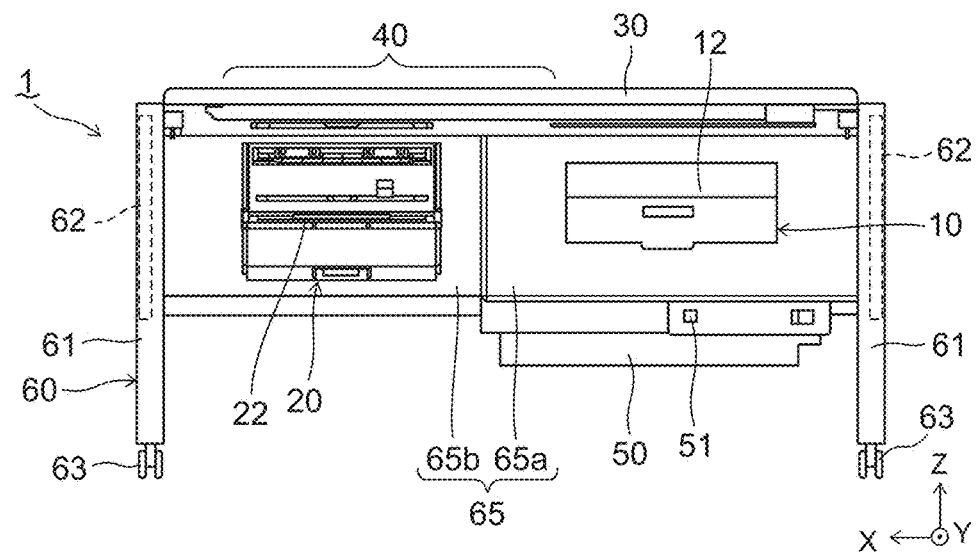
FIG. 5 is a plan view illustrating the system for forming a structure on a print medium according to the embodiment of the present invention.
Figure 6:
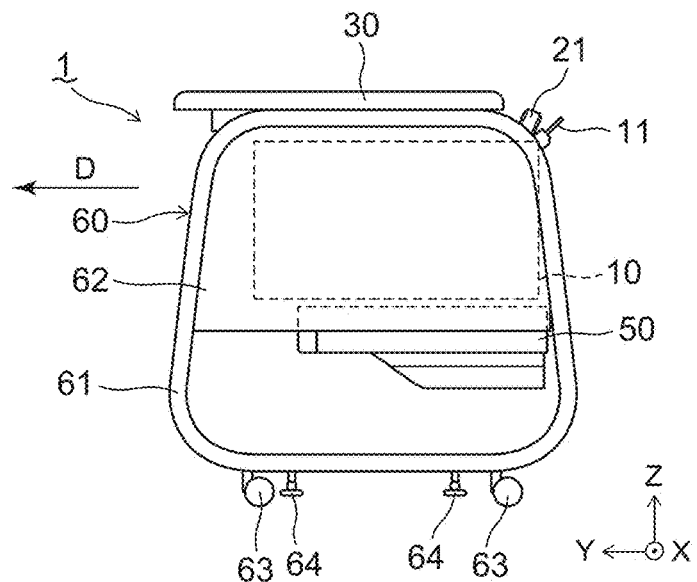
FIG. 6 is a right side view illustrating the system for forming a structure on a print medium according to the embodiment of the present invention.
Figure 7:
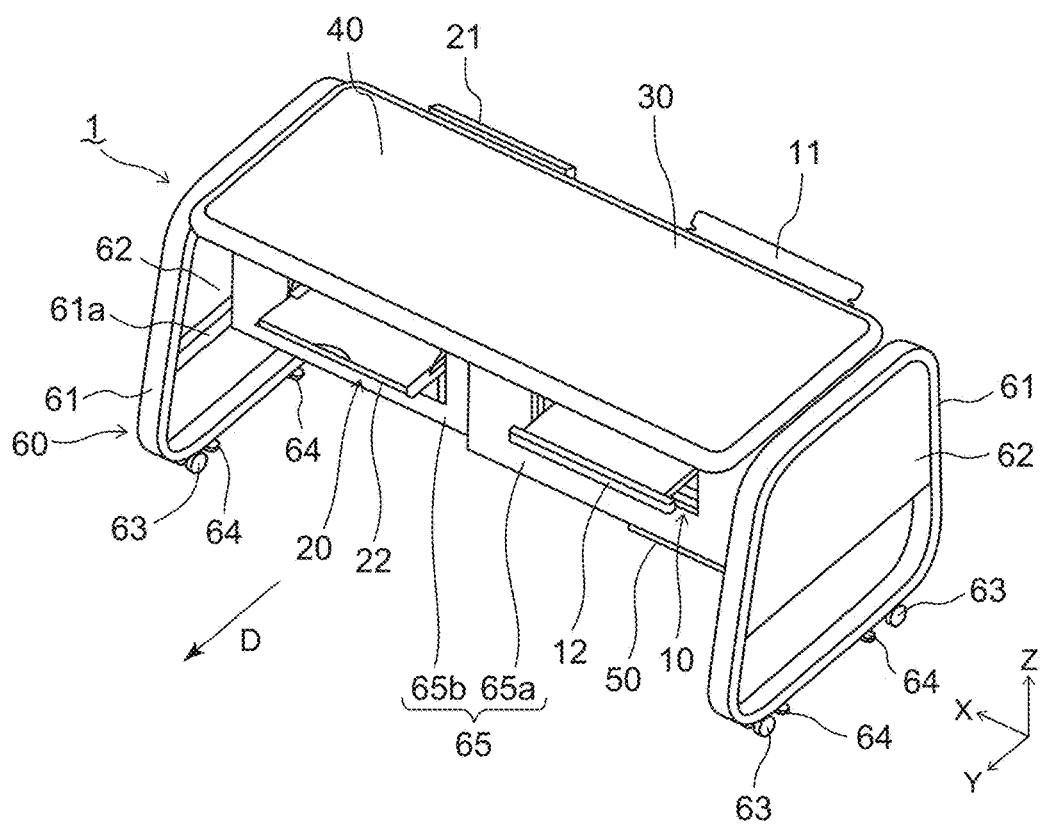
FIG. 7 is a perspective view of the system for forming a structure on a print medium according to the embodiment of the present invention as seen from front right above.

FIGS. 5, 6, and 7 are a front view, right side view, and perspective view as seen from front right above illustrating the system for forming a structure on a print medium 1.

Figure 8:
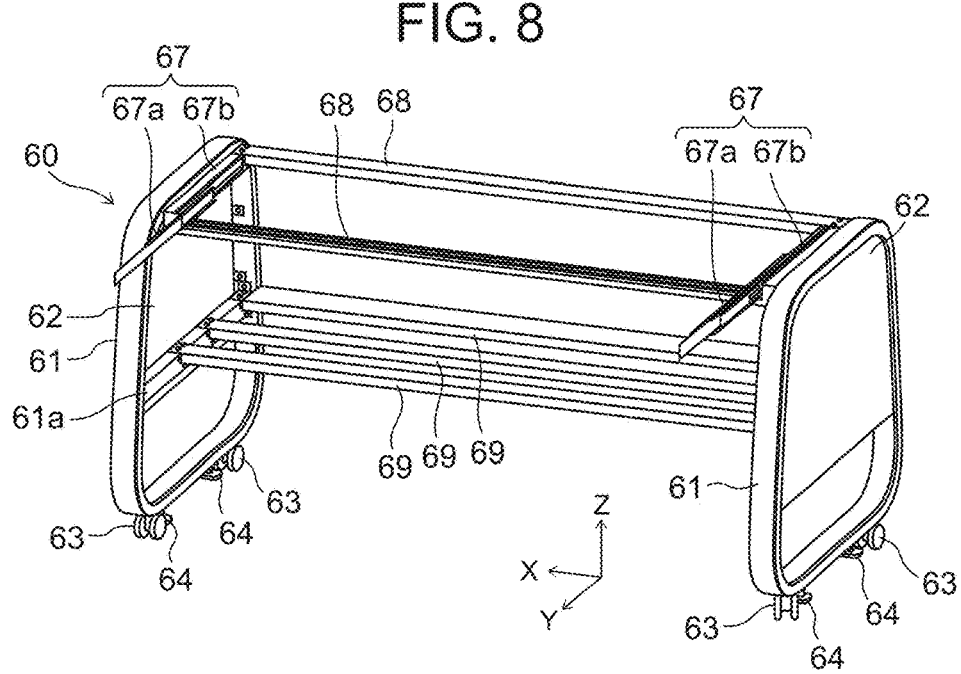
FIG. 8 is a perspective view of a frame in the embodiment of the present invention as seen from front right above.

FIG. 8 is a perspective view of a frame 60 as seen from front right above.

Figure 12:
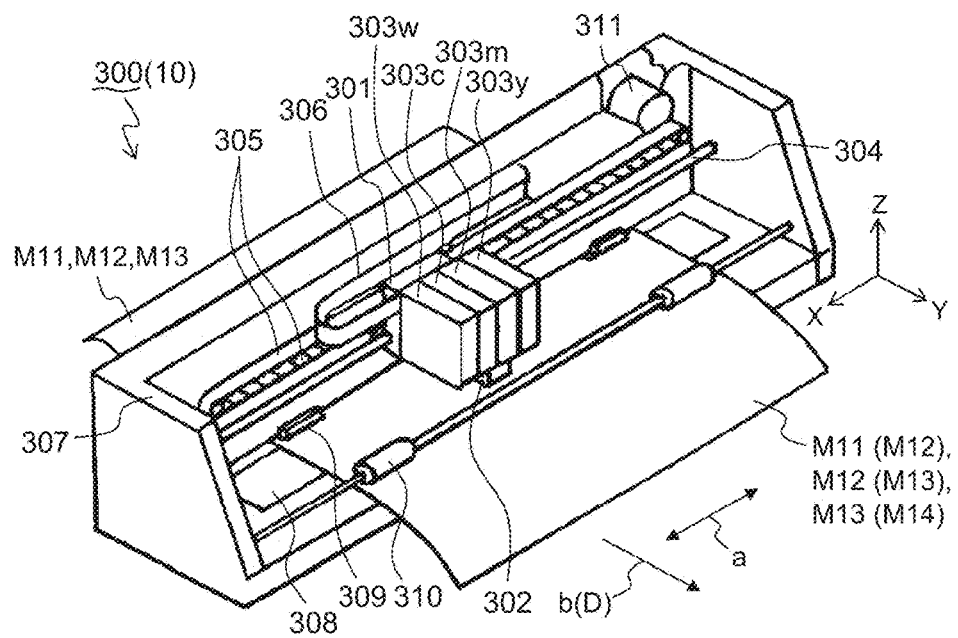
FIG. 12 is a perspective view illustrating a print unit body in the embodiment of the present invention.
Figure 13:
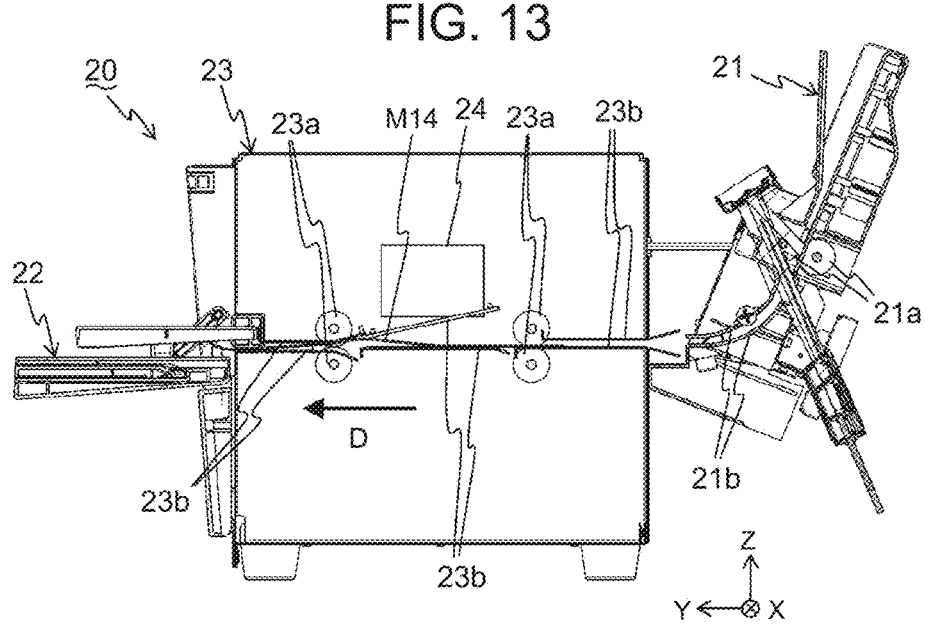
FIG. 13 is a simplified sectional view illustrating the internal structure of an expansion unit in the embodiment of the present invention.

In FIGS. 1A to 8 and the below-mentioned FIGS. 12 and 13, the X direction (first direction) is the same as the direction (horizontal direction) in which a print unit 10 and an expansion unit 20 are aligned, the Y direction (second direction) is the same as the conveyance direction D in which media M11 to M14 are conveyed as illustrated in FIGS. 12 and 13, and the Z direction is the same as the vertical direction. The X direction, the Y direction, and the Z direction are orthogonal to each other.

As illustrated in FIGS. 1A to 7, the system for forming a structure on a print medium 1 includes: the print unit 10 which is an example of a print device; the expansion unit 20 which is an example of an expansion device; the top plate 30; a display unit 40; a control unit 50; and the frame 60.

The print unit 10 includes: a print unit body 300 illustrated in FIG. 12 described later; a suction part (paper feed tray) 11 for sucking the media M11 to M13; and a discharge part 12 for discharging media M12 to M14 obtained by printing the media M11 to M13. The print unit 10 prints a front electromagnetic wave-heat conversion layer 104 and a back electromagnetic wave-heat conversion layer 106 illustrated in FIG. 9A on the media M11 and M13, and prints a color ink layer 105 illustrated in FIG. 9A on the medium M12. This will be described in detail later.

The expansion unit 20 includes: a suction part (paper feed tray) 21 for sucking the medium M14; and a discharge part 22 for discharging the medium M14. The expansion unit 20 irradiates the medium M14 with electromagnetic waves by an irradiation part 24 illustrated in FIG. 13 to expand a foaming resin layer (foaming expansion layer) 102 illustrated in FIG. 9A, thus manufacturing a structure M15 illustrated in FIG. 9B.

The print unit 10 and the expansion unit 20 are aligned in the first direction (X direction). The suction part 11 of the print unit 10 and the suction part 21 of the expansion unit 20 are arranged on one side (back side) in the Y direction which is the second direction intersecting the first direction, and the discharge part 12 of the print unit 10 and the discharge part 22 of the expansion unit 20 are arranged on the other side (front side) in the Y direction. In other words, the suction part 11 of the print unit 10 and the suction part 21 of the expansion unit 20 are aligned along the X direction in which the print unit 10 and the expansion unit 20 are aligned, on one side of the top plate 30 in the direction (Y direction) intersecting the X direction. Meanwhile, the discharge part 12 of the print unit 10 and the discharge part 22 of the expansion unit 20 are aligned along the X direction, on the opposite side of the top plate 30 to the one side in the intersecting direction. The discharge part 12 of the print unit 10 and the discharge part 22 of the expansion unit 20 respectively face the suction part 11 of the print unit 10 and the suction part 21 of the expansion unit 20.

Here, the front side typically means the side on which an operator 400 illustrated in FIGS. 1B to 1D faces the system for forming a structure on a print medium 1. The front side also refers to the lower side of the display contents in the display unit 40 in the up-down direction. The back side refers to the upper side of the display contents in the display unit 40 in the up-down direction. The display orientation of the display unit 40 may be changed optionally. Since the one side in the Y direction is the back side and the other side in the Y direction is the front side as mentioned above, the X direction which is the horizontal direction orthogonal to (intersecting) the Y direction is also referred to as the lateral direction or the right-left direction. FIG. 1B illustrates an example of the display contents (a picture of mountains) displayed in the display unit 40.

The print unit 10 and the expansion unit 20 are desirably able to be pulled out to the front side as an example, in a state where a front panel 65 is removed. The below-mentioned control unit 50 is also desirably able to be pulled out to the front side as an example.

The top plate 30 covers the print unit 10 and the expansion unit 20 from above. The top plate 30 slides along the Y direction by a pair of right and left slide mechanisms 67 of the frame 60 illustrated in FIG. 8, between a closed state illustrated in FIG. 1C, i.e. a state of covering the print unit 10 and the expansion unit 20 from above, and an open state S illustrated in FIG. 1D, i.e. a state of being pulled out so that the upper parts of the print unit 10 and expansion unit 20 are open. Thus, the top plate 30 is slidable in the direction (Y direction) intersecting the X direction in which the print unit 10 and the expansion unit 20 are aligned, by the slide mechanism 67. The top plate 30 may not necessarily slide to such a position where the whole upper parts of the print unit 10 and expansion unit 20 are open, but is desirably slidable to such a position where operations such as maintenance can be performed on the print unit 10 and the expansion unit 20. FIG. 1D illustrates the structure M15 manufactured using the system for forming a structure on a print medium 1, together with the media M12 to M14 which are intermediate products during the manufacture of the structure M15. In FIG. 1D, the media M12 to M14 printed in the same up-down direction as the display contents of the display unit 40 are output.

The display unit 40 displays information about at least one of the print unit 10 and expansion unit 20. As illustrated in FIG. 1A, the upper surface of the display unit 40 is desirably coplanar with the upper surface of the top plate 30. The display unit 40 may include a touch panel for operating at least one of the print unit 10 and expansion unit 20.

The center C2 of the display unit 40 in the X direction is shifted more to the expansion unit 20 side than the center C1 of the top plate 30 in the X direction. In other words, the display unit 40 is shifted more to the expansion unit 20 side than the center C1 of the top plate 30 in the X direction, that is, incorporated at a position close to the end of the top plate 30 in the X direction. The display unit 40 may be shifted more to the print unit 10 side than the center C1 of the top plate 30 in the X direction. However, in the case where the operator 400 is seated facing the expansion unit 20 in order to avoid the legs of the seated operator 400 touching the control unit 50 given that the control unit 50 is located directly below the print unit 10 as described later, the display unit 40 is desirably shifted more to the expansion unit 20 side in terms of the visibility of the operator 400.

An operation unit for operating at least one of the print unit 10 and expansion unit 20 may be located instead of or together with the display unit 40. In this case, for example, the operation unit may include buttons, switches, and dials, and be incorporated in or placed on the top plate 30.

As illustrated in FIG. 1A, the control unit 50 is located directly below the print unit 10. The term "directly below" means that at least part of the control unit 50 is located below the center of the print unit 10 in the X direction and the Y direction, and at least part of the print unit 10 is located above the center of the control unit 50 in the X direction and the Y direction.

The control unit 50 includes a control part for controlling at least one of the print unit 10, expansion unit 20, and display unit 40. The control unit 50 may include a power supply part for supplying power to at least one of the print unit 10, expansion unit 20, and display unit 40. As illustrated in FIGS. 2 and 5, an emergency stop button 51 for stopping the operation of at least one of the print unit 10 and expansion unit 20 is provided in the lower part of the control unit 50. The emergency stop button 51 is desirably provided on the front side of the control unit 50 facing the operator 400.

As illustrated in FIG. 6, the front end (the left end in FIG. 6) of the control unit 50 is located more on the back side (the right side in FIG. 6) than the front end of the print unit 10 (and the expansion unit 20). As illustrated in FIG. 5, the right end of the control unit 50 is located more on the left side than the right end of the print unit 10. Therefore, the control unit 50 is not easily visible from the front side and the right side, as illustrated in FIG. 7. In the case where the control unit 50 is not visible, simpler external appearance is presented to the operator 400 and so design is enhanced, as compared with the case where the control unit 50 is visible.

As illustrated in FIG. 8, the frame 60 includes: a pair of side bases 61; a pair of side panels 62; four movable legs 63; four fixed legs 64; the front panel 65 illustrated in FIGS. 2, 5, and 7; a back panel 66 illustrated in FIG. 3; the pair of slide mechanisms 67; two upper connection beams 68; and three lower connection beams 69.

The pair of side bases 61 are each shaped like a trapezoidal frame (or a substantially rectangular frame) whose lower side is longer than the upper side and whose corners are round (curved) in a side view. The pair of side bases 61 are each provided with a support beam 61a extending in the Y direction to support the ends of the three lower connection beams 69 the upper parts of which have the print unit 10 and the expansion unit 20 fixed thereto.

The pair of side panels 62 each extend from the upper end of the side base 61 to the support beam 61a so as to cover at least the upper half of the hollow portion of the side base 61 while leaving the rest of the hollow portion on the lower side in a side view. As illustrated in FIGS. 5 and 6, the pair of side panels 62 each extend from the upper end of the side base 61 to a lower position than the lower ends of the print unit 10 and expansion unit 20 in a side view. The print unit 10 and the expansion unit 20 do not extend off the side base 61 and the side panel 62 except the suction parts 11 and 21 in a side view. In terms of presenting simple external appearance to the operator 400 to enhance design, the print unit 10 and the expansion unit 20 are desirably not easily visible from the right or left as mentioned above. Although the side panel 62 may cover the whole hollow portion of the side base 61, the side panel 62 desirably covers only part of the hollow portion in terms of saving material cost.

The movable legs 63 are casters for enabling the transportation of the system for forming a structure on a print medium 1, and a total of four movable legs 63, that is, two movable legs 63 for each side base 61, are provided. A total of four fixed legs 64, that is, two fixed legs 64 for each side base 61 between two movable legs 63, are provided. The fixed legs 64 are desirably adjustable in height between an upper position where the transportation of the system for forming a structure on a print medium 1 is enabled and a lower position where the fixed legs 64 are in contact with the ground to disable the movement of the system for forming a structure on a print medium 1.

As illustrated in FIGS. 2, 5, and 7, the front panel 65 covers the front side of the print unit 10 and expansion unit 20, and is open at the discharge parts 12 and 22. The front panel 65 extends from the upper end of each side base 61 to a lower position than the lower ends of the print unit 10 and expansion unit 20 as with the side panels 62, to enhance design. The lower end of the front panel 65 is at substantially the same height as the lower ends of the pair of side panels 62 or the support beams 61a. The front panel 65 is desirably attached and removed easily.

A first surface 65a of the front panel 65 on the front side of the print unit 10 projects more to the front than a second surface 65b of the front panel 65 on the front side of the expansion unit 20. Thus, there is a difference in level between the first surface 65a and the second surface 65b each extending in the X direction and Z direction. The first surface 65a and second surface 65b of the front panel 65 are located more on the back side than the front end of each side base 61.

As illustrated in FIG. 3, the back panel 66 covers the back side of the print unit 10 and expansion unit 20, and is open at the suction parts 11 and 21. The back panel 66 extends from the upper end of each side base 61 to a lower position than the lower ends of the print unit 10 and expansion unit 20 between the pair of side bases 61, to enhance design as with the side panels 62. The lower end of the back panel 66 is at substantially the same height as the lower ends of the pair of side panels 62 or the support beams 61a. The back panel 66 is desirably attached and removed easily.

The back panel 66 lies along the back end of each side base 61. The upper part of the back panel 66 thus includes a curved part 66a curved along the curved part at the back upper end of the side base 61.

The pair of slide mechanisms 67 illustrated in FIG. 8 are provided at the upper ends of the facing surfaces of the respective pair of side bases 61a. Each slide mechanism 67 includes: a slider 67a fixed to, for example, the part of the top plate 30 projecting downward from both ends in the X direction; and a guide rail 67b for guiding the slider 67a to move in the Y direction. Each slide mechanism 67 thus slides the top plate 30 in the Y direction as mentioned above.

The two upper connection beams 68 extend between the pair of side bases 61 to connect the pair of side bases 61. One of the two upper connection beams 68 is fixed to the upper back end of each of the pair of side bases 61, and the other one of the two upper connection beams 68 is fixed to the side base 61 and the guide rail 67*b* in the lower part of the front end of the guide rail 67*b*.

The three lower connection beams 69 extend between the support beams 61*a* of the pair of side bases 61 to connect the pair of side bases 61, apart from each other in the Y direction. The print unit 10 and the expansion unit 20 are fixed to the upper parts of the three lower connection beams 69. In other words, the three lower connection beams 69 are located below the print unit 10 and the expansion unit 20. The control unit 50 is fixed to the lower parts of the three lower connection beams 69. The three lower connection beams 69 are thus provided on the back side.

One of the three lower connection beams 69 is fixed to the back ends of the support beams 61*a* and the back side of the pair of side bases 61, and the other two of the three lower connection beams 69 are located near the center of the support beams 61*a* in the Y direction. The three lower connection beams 69 are not located on the front side of the support beams 61*a* (the front side of the side bases 61), so as not to interfere with the operation of the operator 400 during the maintenance of the system for forming a structure on a print medium 1 and the like.

Since the top plate 30 is located above the two upper connection beams 68 and the print unit 10 and the expansion unit 20 ae located above the three lower connection beams 69, the upper connection beams 68 and the lower connection beams 69 are also not easily visible from the outside.

Figure 9A:
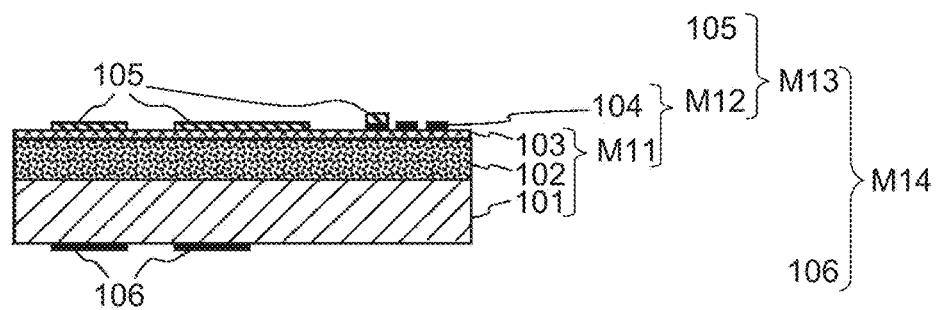
FIG. 9A is a sectional view illustrating a structure manufacturing medium in the embodiment of the present invention.
Figure 9B:
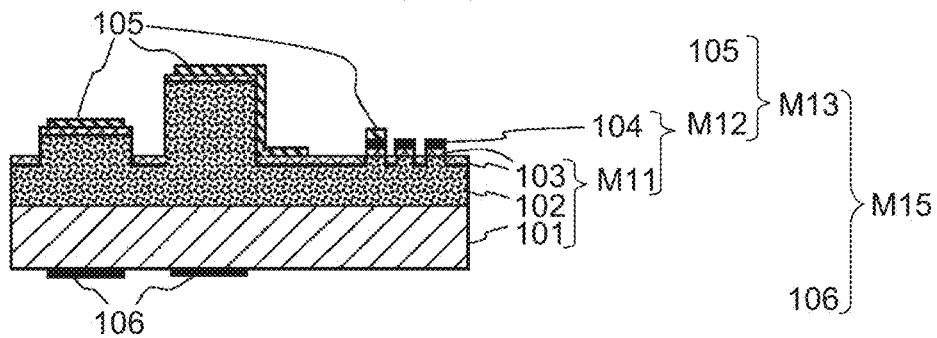
FIG. 9B is a sectional view illustrating a structure in the embodiment of the present invention.

FIG. 9A is a sectional view illustrating the structure manufacturing medium M14 in this embodiment. FIG. 9B is a sectional view illustrating the structure M15 in this embodiment.

The medium M14 illustrated in FIG. 9A is in a state before expanding the foaming resin layer 102 by heating. As illustrated in FIG. 13, the medium M14 is inserted into the expansion unit 20 from the suction part 21 of the expansion unit 20 and irradiated with electromagnetic waves by the irradiation part 24, as a result of which the foaming resin layer 102 expands by heating and the structure M15 illustrated in FIG. 9B is manufactured.

The medium M11 in which a base material 101, the foaming resin layer 102, and an ink receiving layer 103 are stacked in order is inserted into the print unit 10 from the suction part 11 of the print unit 10. The front electromagnetic wave-heat conversion layer 104 is then printed on the medium M11 in the print unit body 300 illustrated in FIG. 12 as an example, and the resulting medium is discharged from the discharge part 12. A color ink layer 105 is printed on the medium M12 in which the front electromagnetic wave-heat conversion layer 104 has been printed. Moreover, the back electromagnetic wave-heat conversion layer 106 is printed on the medium M13 in which the color ink layer 105 has been printed. The front electromagnetic wave-heat conversion layer 104 and the back electromagnetic wave-heat conversion layer 106 are each an example of an electromagnetic wave-heat conversion layer for converting electromagnetic waves into heat. The color ink layer 105 is an example of an image layer.

The base material 101 is made of, for example, paper, cloth such as canvas, or a panel material such as plastic, although the material is not particularly limited.

In the foaming resin layer 102, a thermal foaming agent (thermally expandable microcapsules) is distributed in a binder which is thermoplastic resin provided on the base material 101. The foaming resin layer 102 thus foams to expand according to the amount of absorbed heat. The foaming resin layer 102 is an example of an expansion layer that expands by heating.

The ink receiving layer 103 is formed with a thickness of 10 μm as an example, so as to cover the whole upper surface of the foaming resin layer 102. The ink receiving layer 103 is made of a suitable material for receiving printing ink used for an inkjet printer, printing toner used for a laser printer, ink of a ballpoint pen or fountain pen, graphite of a pencil, or the like and fixing it at least to the surface, and may be a general-purpose ink receiving layer used for inkjet printing paper and the like.

Each of the ink receiving layer 103, front electromagnetic wave-heat conversion layer 104, and back electromagnetic wave-heat conversion layer 106, in the case of having elasticity, deforms with the foaming expansion of the foaming resin layer 102, which suppresses the formation of a clearance between the foaming resin layer 102 and the ink receiving layer 103, between the ink receiving layer 103 and the front electromagnetic wave-heat conversion layer 104, and between the base material 101 and the back electromagnetic wave-heat conversion layer 106. The formation of such a clearance may cause a reduction in the amount of heat transferred from the front electromagnetic wave-heat conversion layer 104 to the foaming resin layer 102.

FIG. 10 is a flowchart for describing a structure manufacturing method in this embodiment.

First, the aforementioned medium M11 is prepared. Next, black ink (black material) including carbon black is inkjet printed as the front electromagnetic wave-heat conversion layer 104 in the part where the expansion layer 102 is to be expanded on the first surface of the medium M11 provided with the expansion layer 102, i.e. the front surface of the ink receiving layer 103, using the print unit body 300 which is a general-purpose inkjet printer illustrated in FIG. 12. As a result, the front electromagnetic wave-heat conversion layer 104 is formed (step S11: first surface electromagnetic wave-heat conversion layer formation step). The medium M11 on which the front electromagnetic wave-heat conversion layer 104 has been formed is referred to as the medium M12.

The print unit body 300 reads a gray scale value set for each coordinate and, based on the read value, prints the black material (black ink) while controlling its density by area coverage modulation as an example. The front electromagnetic wave-heat conversion layer 104 is made of a material that converts electromagnetic waves into heat energy more easily than the materials of the base material 101, foaming resin layer 102, and ink receiving layer 103 included in the medium M11. The front electromagnetic wave-heat conversion layer 104 may be any layer that converts electromagnetic waves into heat, and may be a layer other than a layer formed by the print unit body 300.

The same applies to the back electromagnetic wave-heat conversion layer 106. Here, in the case where the front electromagnetic wave-heat conversion layer 104 is irradiated with the same amount of electromagnetic waves, the foaming resin layer 102 absorbs more heat energy in the region corresponding to the part where the density (e.g. area coverage modulation) of the front electromagnetic wave-heat conversion layer 104 is higher. Basically, the foaming height of the foaming resin layer 102 is positively correlated with the amount of heat absorbed by the foaming resin layer 102. Hence, the foaming height of the foaming resin layer 102 is higher in the part where the density of the front electromagnetic wave-heat conversion layer 104 or back electromagnetic wave-heat conversion layer 106 is higher. The shading of the front electromagnetic wave-heat conversion layer 104 is accordingly determined to correspond to the target height of the three-dimensional shape formed by the foaming expansion of the foaming resin layer 102, as with the below-mentioned back electromagnetic wave-heat conversion layer 106.

Following this, color inks of three colors of cyan C, magenta M, and yellow Y as coloring materials are inkjet printed on the first surface of the medium M12, i.e. the front surface provided with the front electromagnetic wave-heat conversion layer 104, using the print unit body 300 illustrated in FIG. 12. The color ink layer 105 is thus formed (step S12: image layer formation step). The medium M12 on which the color ink layer 105 has been formed is referred to as the medium M13.

Here, when black ink including carbon black is used in the image layer formation step S12, heat generated by converting electromagnetic waves by this black ink part transfers to the foaming resin layer 102, as a result of which a desired foaming state of the foaming resin layer 102 cannot be achieved. Hence, the color of black or gray in the color ink layer 105 may be formed using a color mixture of cyan C, magenta M, and yellow Y or using black ink that does not absorb heat energy, i.e. ink of black K not including carbon black. Alternatively, in consideration of the heat absorptivity of each part of the color ink layer 105, such heat absorptivity may be deducted to determine the heat absorptivity, i.e. shading, of the front heat conversion layer 104.

Since the density of the color ink layer 105 decreases as the foaming resin layer 102 foams to expand and the surface area of the foaming resin layer 102 increases, visual coloration becomes lighter after the below-mentioned foaming expansion of the foaming resin layer 102 than before the foaming expansion. In view of this, the color ink layer 105 may be set so as to have desired visual coloration after the expansion of the foaming resin layer 102. In detail, the formation density of the color ink layer 105 to be formed in the part where the expansion of the foaming resin layer 102 is set to be greater may be higher.

In the image layer formation step S12, a black ink layer may be formed by monochrome printing instead of forming the color ink layer 105. The color ink layer 105 or the black ink layer may be formed by means other than the print unit body 300 which is an inkjet printer, such as a laser printer.

Next, black ink (black material) including carbon black is inkjet printed on the second surface opposite to the first surface provided with the expansion layer 102 in the medium M11, i.e. the back surface of the base material 101, using the print unit body 300 illustrated in FIG. 12. The back electromagnetic wave-heat conversion layer 106 is thus formed (step S13: second surface electromagnetic wave-heat conversion layer formation step). The medium M13 on which the back electromagnetic wave-heat conversion layer 106 has been formed is referred to as the medium M14. The method of forming the back electromagnetic wave-heat conversion layer 106 may be the same as that of the front electromagnetic wave-heat conversion layer 104. One of the front electromagnetic wave-heat conversion layer 104 and back electromagnetic wave-heat conversion layer 106 may be omitted. The back electromagnetic wave-heat conversion layer 106 may be formed before forming the front electromagnetic wave-heat conversion layer 104, or after forming the front electromagnetic wave-heat conversion layer 104 and before forming the color ink layer 105.

Next, the medium M14 is irradiated with electromagnetic waves from the second surface, i.e. the back electromagnetic wave-heat conversion layer 106 (step S14: second surface electromagnetic wave irradiation step), and then irradiated with electromagnetic waves from the first surface, i.e. the color ink layer 105 (step S15: first surface electromagnetic wave irradiation step). The first surface electromagnetic wave irradiation step S15 may be performed before or simultaneously with the second surface electromagnetic wave irradiation step S14. In the case where one of the front electromagnetic wave-heat conversion layer 104 and back electromagnetic wave-heat conversion layer 106 is omitted, the second surface electromagnetic wave irradiation step S14 or the first surface electromagnetic wave irradiation step S15 is omitted accordingly.

The second surface electromagnetic wave irradiation step S14 and the first surface electromagnetic wave irradiation step S15 may be steps for expanding the foaming resin layer 102 by heating through irradiation with electromagnetic waves in a wavelength region absorbed by the back electromagnetic wave-heat conversion layer 106 and the front electromagnetic wave-heat conversion layer 104, and are performed by the irradiation part 24 illustrated in FIG. 13. In particular, the back electromagnetic wave-heat conversion layer 106 and the front electromagnetic wave-heat conversion layer 104 each convert electromagnetic waves into heat, and the heat is transferred to the thermal foaming agent included in the foaming resin layer 102, as a result of which the thermal foaming agent undergoes expansion reaction. The foaming resin layer 102 foams to expand according to the black density of each of the back electromagnetic wave-heat conversion layer 106 and front electromagnetic wave-heat conversion layer 104. A structure is manufactured from the medium M11 in this way. Even when the part of the foaming resin layer 102 where neither the back electromagnetic wave-heat conversion layer 106 nor the front electromagnetic wave-heat conversion layer 104 is not formed absorbs heat energy, the amount of heat is sufficiently small, so that the height does not change substantially or the height changes sufficiently small as compared with the part where the back electromagnetic wave-heat conversion layer 106 or the front electromagnetic wave-heat conversion layer 104 is formed.

The wavelength of the electromagnetic waves with which the back electromagnetic wave-heat conversion layer 106 and the front electromagnetic wave-heat conversion layer 104 are irradiated may be changed as appropriate according to the back electromagnetic wave-heat conversion layer 106 and the front electromagnetic wave-heat conversion layer 104. Carbon black used in the back electromagnetic wave-heat conversion layer 106 and the front electromagnetic wave-heat conversion layer 104 tends to absorb electromagnetic waves of wavelengths that are centered on a near-infrared region (750 nm to 1400 nm) and include a visible light region (380 nm to 750 nm) and a mid-infrared region (1400 nm to 4000 nm), as compared with electromagnetic waves of other wavelengths. A material other than carbon black may be used as the back electromagnetic wave-heat conversion layer 106 and the front electromagnetic wave-heat conversion layer 104, and electromagnetic waves of a desired wavelength region out of the whole wavelength region may be applied depending on the material used. Thus, depending on the material, electromagnetic waves of other wavelengths may be applied such as a near-ultraviolet region (200 nm to 380 nm), a far-ultraviolet region (10 nm to 200 nm), or an infrared region (4000 nm to 15000 nm) other than near-infrared and mid-infrared. These numerals are merely an example, and the wavelength region boundaries are not limited to these numerals.

The control unit 50 may be a computer 200 illustrated in FIG. 11, that is, a computer including a central processing unit (CPU) 201, a storage unit 202, an input unit 203, an interface unit 204, and a recording medium drive unit 205. These components are connected via a bus line 206, and transfer various data with each other.

The CPU 201 is a processor for controlling the overall operation of the computer 200. The CPU 201 reads and executes a structure manufacturing program to control the manufacture of the structure.

The storage unit 202 includes read only memory (ROM), random access memory (RAM), a hard disk, etc.

The ROM is read only semiconductor memory in which a predetermined basic control program is recorded beforehand. Nonvolatile memory that can store data when power supply is off, such as flash memory, may be used as the ROM.

The RAM is readable and writable semiconductor memory used as a working storage area according to need when the CPU 201 executes various control programs.

The hard disk stores various control programs executed by the CPU 201 and various data.

The input unit 203 is, for example, a keyboard device and a mouse device. When operated by the user of the computer 200, the input unit 203 acquires input information from the user associated with the operation, and sends the acquired input information to the CPU 201.

The interface unit 204 manages the transfer of various information between various devices.

The recording medium drive unit 205 is a device for reading various control programs and data recorded in a portable recording medium 207. The CPU 201 may read and execute a predetermined control program recorded in the portable recording medium 207 through the recording medium drive unit 205, to perform each process for structure manufacturing.

Examples of the portable recording medium 207 include compact disc read only memory (CD-ROM), digital versatile disc read only memory (DVD-ROM), and flash memory including a USB connector.

To cause the computer 200 to operate as the control unit 50 of the system for forming a structure on a print medium 1, first a control program for causing the CPU 201 to perform each process is generated. The generated control program is stored in the hard disk device in the storage unit 202 or the portable recording medium 207 beforehand. When a predetermined instruction is issued to the CPU 201, the CPU 201 reads and executes the control program. The computer 200 thus operates as the control unit 50.

FIG. 12 is a perspective view illustrating the print unit body 300 in this embodiment.

The print unit body 300 is placed inside the print unit 10, and includes a carriage 301 capable of reciprocating in the direction, indicated by the two-headed arrow a, orthogonal to the medium conveyance direction. A print head 302 for executing printing and an ink cartridge 303 (303w, 303c, 303m, 303y) storing ink are attached to the carriage 301.

The cartridges 303w, 303c, 303m, and 303y respectively store color inks of white W, cyan C, magenta M, and yellow Y. These cartridges are individually disposed separately from each other, or the ink chambers are integrated into one housing. The cartridges are connected to the print head 302 having nozzles for ejecting the respective color inks.

The carriage 301 is slidably supported by a guide rail 304 on one side, and fastened to a toothed drive belt 305 on the other side. Thus, the print head 302 and the ink cartridge 303 (303w, 303c, 303m, 303y) reciprocate in the direction, indicated by the two-headed arrow a in FIG. 12, orthogonal to the conveyance direction D, i.e. in the print main scanning direction, together with the carriage 301.

A flexible communication cable 306 is connected between the print head 302 and the control unit 50 via an internal frame 307. Hence, print data and print control data are output to the print head 302 via the flexible communication cable 306, and the print head 302 is controlled based on these data.

A platen 308 is provided in the lower part of the internal frame 307 at the position facing the print head 302, so as to extend in the main scanning direction of the print head 302. The platen 308 constitutes part of the medium conveyance path. Each of the medium M11 on which the front electromagnetic wave-heat conversion layer 104 is formed, the medium M12 on which the color ink layer 105 is formed, and the medium M13 on which the back electromagnetic wave-heat conversion layer 106 is formed is, in a state where its lower surface is in contact with the platen 308, intermittently conveyed in the print sub-scanning direction indicated by the arrow b in FIG. 12 which is the conveyance direction D, by a suction roller pair 409 (the lower roller is hidden behind the medium M11, M12, or M13 and is not visible in FIG. 12) and a discharge roller pair 310 (the lower roller is equally not visible). The suction roller pair 309 and the discharge roller pair 310 are controlled by the control unit 50.

The control unit 50 controls a motor 311, the print head 302, the suction roller pair 309, and the discharge roller pair 310, to convey the print head 302 to an appropriate position in the main scanning direction together with the carriage 301 via the drive belt 305 connected to the motor 311. Moreover, during the period in which the conveyance of the medium M12 is stopped, the control unit 50 causes the print head 302 to direct a jet of color ink drops of cyan C, magenta M, and yellow Y and a jet of black ink drops of black K toward the medium M12, to print the color ink layer 105 on the medium M12. During the period in which the conveyance of the medium M11 or the medium M13 is stopped, the control unit 50 causes the print head 302 to direct a jet of black ink drops of black K toward the medium M11 or the medium M13, to print the front electromagnetic wave-heat conversion layer 104 on the medium M11 or the back electromagnetic wave-heat conversion layer 106 on the medium M13.

FIG. 13 is a simplified sectional view of the internal structure of the expansion unit 20 in this embodiment.

As illustrated in FIG. 13, the expansion unit 20 includes the aforementioned suction part 21 and discharge part 22, a housing 23, and the irradiation part 24 placed inside the housing 23. In the expansion unit 20, the medium M14 sucked from the suction part 21 is conveyed by a conveyance roller 21a of the suction part 21 and a conveyance roller 23a of the housing 23 which are an example of a conveyance part, while being guided by a conveyance guide 21b of the suction part 21 and a conveyance guide 23b of the housing 23.

The irradiation part 24 irradiates the medium M14 with electromagnetic waves, as mentioned above. The irradiation part 24 is, for example, a halogen lamp, and applies light of a near-infrared region (750 nm to 1400 nm).

In the embodiment described above, the system for forming a structure on a print medium 1 includes: the print unit 10 which is an example of a print device for printing the front electromagnetic wave-heat conversion layer 104 and the back electromagnetic wave-heat conversion layer 106 which are an example of an electromagnetic wave-heat conversion layer for converting electromagnetic waves into heat, on the media M11 and M13 including the foaming resin layer 102 which is an example of an expansion layer that expands by heating; the expansion unit 20 which is an example of an expansion device aligned laterally (X direction) with the print unit 10, for expanding the foaming resin layer 102 by irradiating the medium M14 with electromagnetic waves; and the top plate 30 covering the print unit 10 and expansion unit 20 from above.

By performing the electromagnetic wave-heat conversion layer formation and the electromagnetic wave irradiation independently of each other in the independent print unit 10 and expansion unit 20, the electromagnetic wave-heat conversion layer formation and the electromagnetic wave irradiation can be performed at desired timings by dedicated devices. This eases the manufacture of a structure in a desired foaming expansion state. Meanwhile, the operator 400 performs the operation of inserting and removing the medium M12, M13, or M14 on each of the print unit 10 and expansion unit 20. In this embodiment, however, the print unit 10 and the expansion unit 20 are aligned laterally, and the top plate 30 is located above the print unit 10 and the expansion unit 20, so that the operator 400 can perform operation on the print unit 10 and the expansion unit 20 at the same level of height while simply facing the system for forming a structure on a print medium 1 without moving or with a slight movement. This enhances workability. Workability is also enhanced as the media M11 to M14 or objects relating to other operations can be put on the top plate 30. Thus, according to this embodiment, workability is enhanced when manufacturing a structure using a system that combines a device (print unit 10) for forming an electromagnetic wave-heat conversion layer and a device (expansion unit 20) for irradiating with electromagnetic waves.

In this embodiment, the display unit 40 for displaying information about at least one of the print unit 10 and expansion unit 20 is incorporated in the top plate 30. This enables the operator 400 to perform other operation on the top plate 30 while viewing the display unit 40 incorporated in the top plate 30, which further enhances workability.

In this embodiment, the upper surface of the display unit 40 is coplanar with the upper surface of the top plate 30. This eases operation on the top plate 30, which further enhances workability.

In this embodiment, the display unit 40 is located close to the end of the top plate 30 in the lateral direction (X direction) in which the print unit 10 and the expansion unit 20 are aligned. This enables operation to be performed in the space on the top plate 30 opposite to the side where the display unit 40 is located close to the end, which further enhances workability.

In this embodiment, the suction part 11 of the print unit 10 and the suction part 21 of the expansion unit 20 are aligned along the lateral direction (X direction) in which the print unit 10 and the expansion unit 20 are aligned, on one side of the top plate 30 in the direction (Y direction) intersecting the lateral direction. The discharge part 12 of the print unit 10 and the discharge part 22 of the expansion unit 20 are aligned along the lateral direction (X direction), on the opposite side of the top plate 30 to the one side in the intersecting direction (Y direction). This enables the insertion and removal of the medium on the print unit 10 and the expansion unit 20 to be performed from the same side. This further enhances workability as, for example, the print state or the foaming expansion state can be easily checked from the front side where the discharge parts 12 and 22 are provided.

In this embodiment, the slide mechanisms 67 slide the top plate 30 in the direction (Y direction) intersecting the lateral direction (X direction) in which the print unit 10 and the expansion unit 20 are aligned. By sliding the top plate 30 to open the upper parts of the print unit 10 and expansion unit 20 in this way, ink replacement in the print unit 10, maintenance such as clearing a jam in the print unit 10 and the expansion unit 20, and other operation can be carried out. This further enhances workability.

In this embodiment, the control unit 50 is located directly below the print unit 10. This prevents the electronic parts included in the control unit 50 and the like from being damaged due to high-temperature environment, as compared with the case where the control unit 50 is located directly below the expansion unit 20 which tends to be higher in temperature than the print unit 10.

While an embodiment of the present invention has been described above, the invention of the present application includes the inventions defined in the claims and their equivalent scope. The inventions defined in the claims in the present application as originally filed are as follows.

What is claimed is:

1. A system for forming a structure on a print medium, the system comprising:
    a print device for printing an electromagnetic wave-heat conversion layer for converting electromagnetic waves into heat, on a medium including an expansion layer that expands by heating;
    an expansion device aligned laterally with the print device, for expanding the expansion layer by irradiating the medium with electromagnetic waves;
    a top plate covering the print device and the expansion device from above; and a slide mechanism for sliding the top plate in a direction intersecting a lateral direction in which the print device and the expansion device are aligned.

2. The system for forming a structure on a print medium according to claim 1, further comprising a display unit for displaying information about at least one of the print device and the expansion device,
    wherein the display unit is incorporated in the top plate.

3. The system for forming a structure on a print medium according to claim 2,
    wherein an upper surface of the display unit is coplanar with an upper surface of the top plate.

4. The system for forming a structure on a print medium according to claim 2,
    wherein the display unit is incorporated at a position close to an end of the top plate in the lateral direction in which the print device and the expansion device are aligned.

5. The system for forming a structure on a print medium according to claim 2,
    wherein a center of the display unit is located more on an expansion device side than a center of the top plate.

6. The system for forming a structure on a print medium according to claim 1, further comprising a pair of side bases,
    wherein the pair of side bases are each shaped like a frame whose lower side is longer than an upper side thereof and whose corners are round.

7. The system for forming a structure on a print medium according to claim 6,
    wherein the pair of side bases are provided with a respective pair of side panels, and
    wherein the pair of side panels each cover at least an upper half of a hollow portion of a corresponding one of the pair of side bases.

8. The system for forming a structure on a print medium according to claim 7,
wherein the pair of side panels each cover the hollow portion of the corresponding one of the pair of side bases, to a lower position than a lower end of each of the print device and the expansion device.

9. A system for forming a structure on a print medium, the system comprising:
a print device for printing an electromagnetic wave-heat conversion layer for converting electromagnetic waves into heat, on a medium including an expansion layer that expands by heating;
an expansion device aligned laterally with the print device, for expanding the expansion layer by irradiating the medium with electromagnetic waves; and
a top plate covering the print device and the expansion device from above,
wherein each of the print device and the expansion device includes:
a suction part for sucking the medium; and
a discharge part for discharging the medium, and
wherein the suction part of the print device and the suction part of the expansion device are aligned along a lateral direction in which the print device and the expansion device are aligned, on a back side which is one side of the top plate in a direction intersecting the lateral direction.

10. The system for forming a structure on a print medium according to claim 9,
wherein the discharge part of the print device and the discharge part of the expansion device are aligned along the lateral direction, on a front side which is an opposite side to the back side in the intersecting direction.

11. The system for forming a structure on a print medium according to claim 9, further comprising a control unit located directly below the print device.

12. The system for forming a structure on a print medium according to claim 11,
wherein the control unit controls at least one of the print device and the expansion device, and
wherein a stop button for stopping operation of at least one of the print device and the expansion device is provided on a front side of the control unit.

13. The system for forming a structure on a print medium according to claim 12,
wherein a front end of the control unit is located more on a back side than a front end of each of the print device and the expansion device.

14. The system for forming a structure on a print medium according to claim 9, further comprising a back panel covering a back side of the print device and the expansion device,
wherein the back panel is open at a position corresponding to the suction part of the print device and the suction part of the expansion device.

15. The system for forming a structure on a print medium according to claim 14, further comprising a pair of side bases,
wherein the back panel extends from an upper end of the pair of side bases to a lower position than a lower end of each of the print device and the expansion device.

16. The system for forming a structure on a print medium according to claim 15,
wherein an upper part of the back panel lies along a back side of the pair of side bases, in a curved shape.

17. A system for forming a structure on a print medium comprising:
a print device for printing an electromagnetic wave-heat conversion layer for converting electromagnetic waves into heat, on a medium including an expansion layer that expands by heating; and
an expansion device aligned laterally with the print device, for expanding the expansion layer by irradiating the medium with electromagnetic waves,
wherein each of the print device and the expansion device includes:
a suction part for sucking the medium; and
a discharge part for discharging the medium, and
wherein the suction part of the print device and the suction part of the expansion device are aligned along a lateral direction in which the print device and the expansion device are aligned.

18. The system for forming a structure on a print medium according to claim 17,
wherein the discharge part of the print device and the discharge part of the expansion device respectively face the suction part of the print device and the suction part of the expansion device.

* * * * *